US009911115B1

(12) United States Patent
Hendren et al.

(10) Patent No.: US 9,911,115 B1
(45) Date of Patent: *Mar. 6, 2018

(54) SYSTEMS AND METHODS FOR CONDUCTING TRANSACTIONS WITH A CUSTOMER USING TEXT MESSAGES

(71) Applicant: West Corporation, Omaha, NE (US)

(72) Inventors: Chad David Hendren, Omaha, NE (US); Kenneth A. Darby, Papillion, NE (US); James Frazier, Omaha, NE (US); Steven Gass, Omaha, NE (US); Sandra Stetich, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,736

(22) Filed: Mar. 28, 2017

Related U.S. Application Data

(63) Continuation of application No. 14/860,892, filed on Sep. 22, 2015, now Pat. No. 9,607,345, which is a continuation of application No. 14/476,801, filed on Sep. 4, 2014, now Pat. No. 9,143,831, which is a continuation of application No. 14/089,927, filed on Nov. 26, 2013, now Pat. No. 8,839,311, which is a continuation of application No. 12/726,512, filed on Mar. 18, 2010, now Pat. No. 8,621,536.

(51) Int. Cl.
*G06Q 20/32* (2012.01)
*H04W 4/12* (2009.01)
*H04N 21/472* (2011.01)

(52) U.S. Cl.
CPC ... *G06Q 20/3255* (2013.01); *H04N 21/47202* (2013.01); *H04W 4/12* (2013.01)

(58) Field of Classification Search
None
See application file for complete search history.

(56) References Cited

U.S. PATENT DOCUMENTS

| 8,948,793 | B1* | 2/2015 | Birkhold | G06Q 10/109 370/277 |
|---|---|---|---|---|
| 2008/0307452 | A1* | 12/2008 | Kim | H04N 5/445 725/32 |
| 2009/0018898 | A1* | 1/2009 | Genen | G06Q 30/0601 705/26.7 |
| 2009/0325614 | A1* | 12/2009 | Sohn | H04L 12/14 455/466 |
| 2011/0161182 | A1* | 6/2011 | Racco | G06Q 30/0277 705/14.73 |

* cited by examiner

*Primary Examiner* — Hoang-Vu A Nguyen-Ba
(74) *Attorney, Agent, or Firm* — Raffi Gostanian

(57) ABSTRACT

The illustrative embodiments described herein provide systems and methods for conducting transactions with a customer using text messages. In one embodiment, a method includes receiving a first text message from a mobile communication device associated with a customer. The first text message includes a request from the customer to receive one or more text messages from a vendor. The method also includes adding the customer to a set of consenting customers in a customer database in response to receiving the first text message. The set of consenting customer including customers that consent to receiving text messages from the vendor. The method also includes sending a second text message to the mobile communication device. The second text message is associated with a service offered by the vendor.

20 Claims, 11 Drawing Sheets

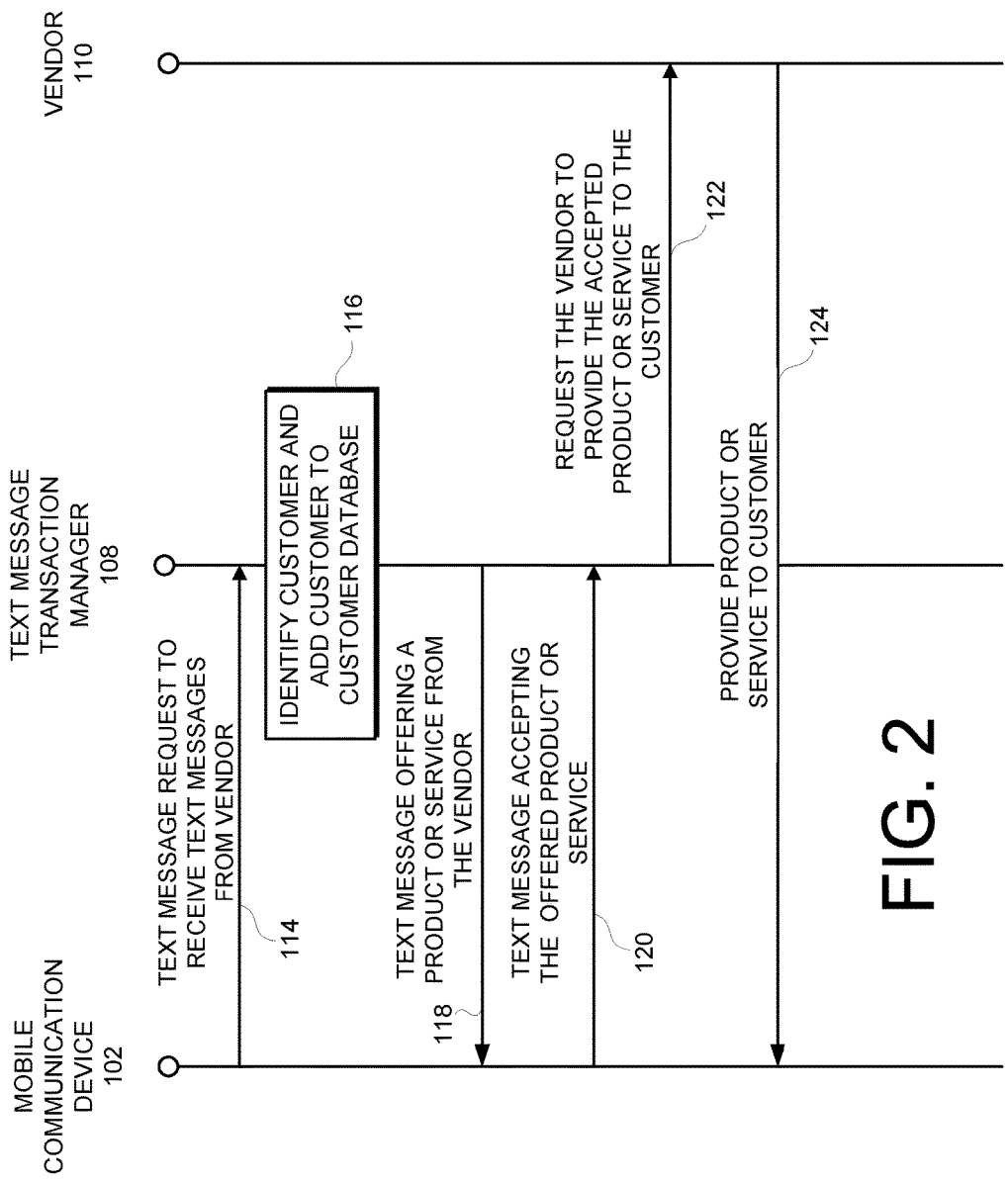

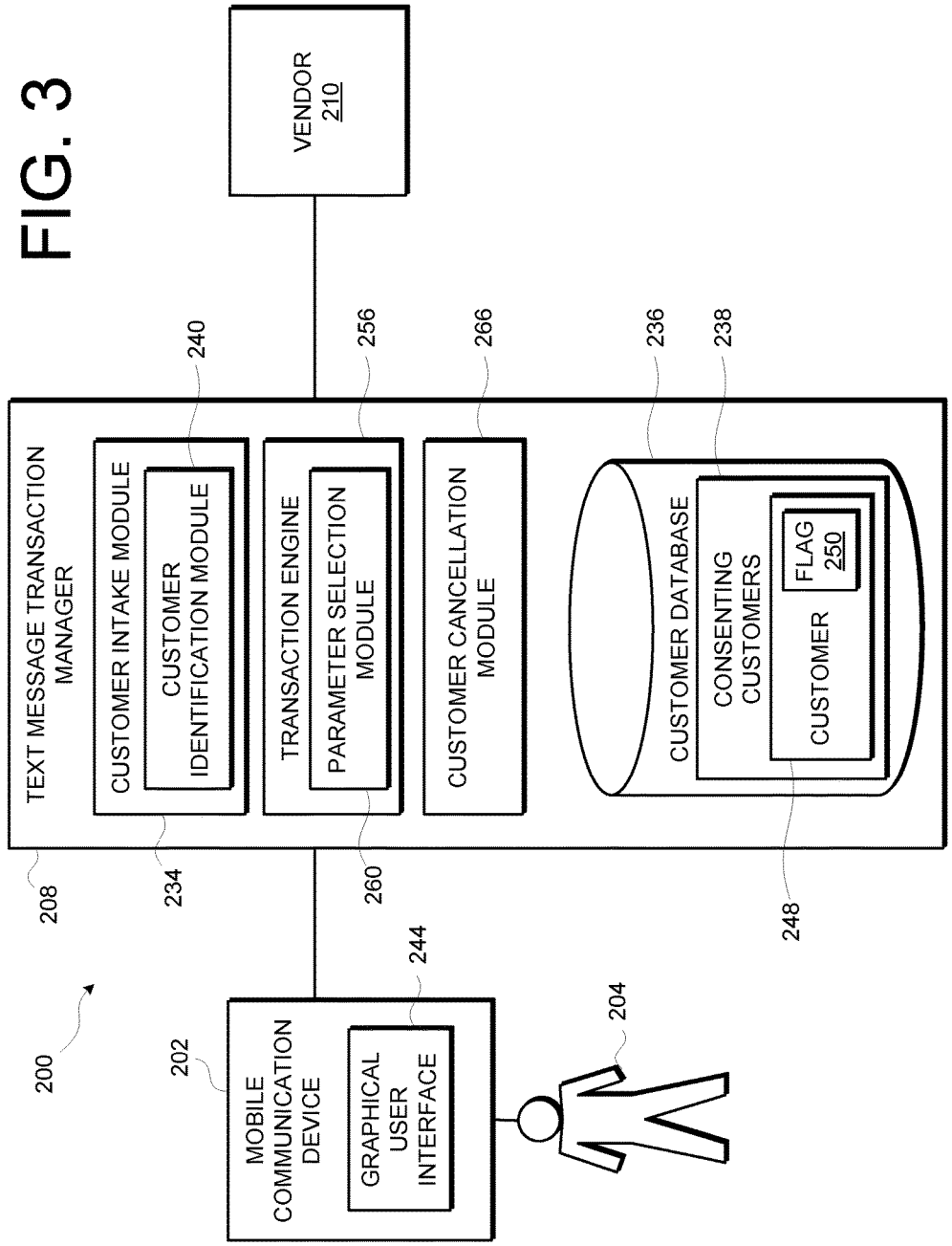

FIG. 4 — 252: CONGRATS TEXT-TO-SAVE CLUB MEMBER. TEXT 'YES' TO GET ADVERTISED MOVIE & RECEIVE FREE MOVIE TRAILER. MESSAGE & DATA RATES MAY APPLY. REPLY 'HELP' FOR HELP. REPLY 'STOP' TO CANCEL.

FIG. 5 — 242: PLEASE ENTER PHONE NUMBER ASSOCIATED YOUR VENDOR ACCOUNT.

FIG. 6 — 246: PLEASE CALL TEXT-TO-SAVE CLUB AT 555-555-5555 OR GO TO OUR WEBSITE.

FIG. 7 — 255: YOU'RE ALREADY IN THE TEXT-TO-SAVE CLUB. CALL 555-555-5555 OR GO TO OUR WEBSITE.

FIG. 8 — 258: PLEASE ENTER THE VENDOR PASSWORD ASSOCIATED WITH YOUR ACCOUNT.

FIG. 9 — 262: PRESS 1 FOR STANDARD DEFINITION FOR $#.##. PRESS 2 FOR HIGH DEFINITION FOR $#.##.

FIG. 10 — 264: ANYMOVIE ON CHANNEL #. ENJOY YOUR MOVIE FOR A FULL 24 HOURS & THANK YOU.

FIG. 11 — 268: THANK YOU. YOU WON'T BE CONTACTED FOR FUTURE TEXT-TO-SAVE CLUB OFFERS. FOR QUESTIONS, CALL 555-555-5555 OR GO TO OUR WEBSITE.

FOR HELP WITH THE
TEXT-TO-SAVE CLUB,
PLEASE CALL 555-555-
5555 OR GO TO OUR
WEBSITE.

~254

270~

WE DO NOT RECOGNIZE
YOUR RESPONSE. FOR
HELP CALL 555-555-5555
OR GO TO OUR WEBSITE.

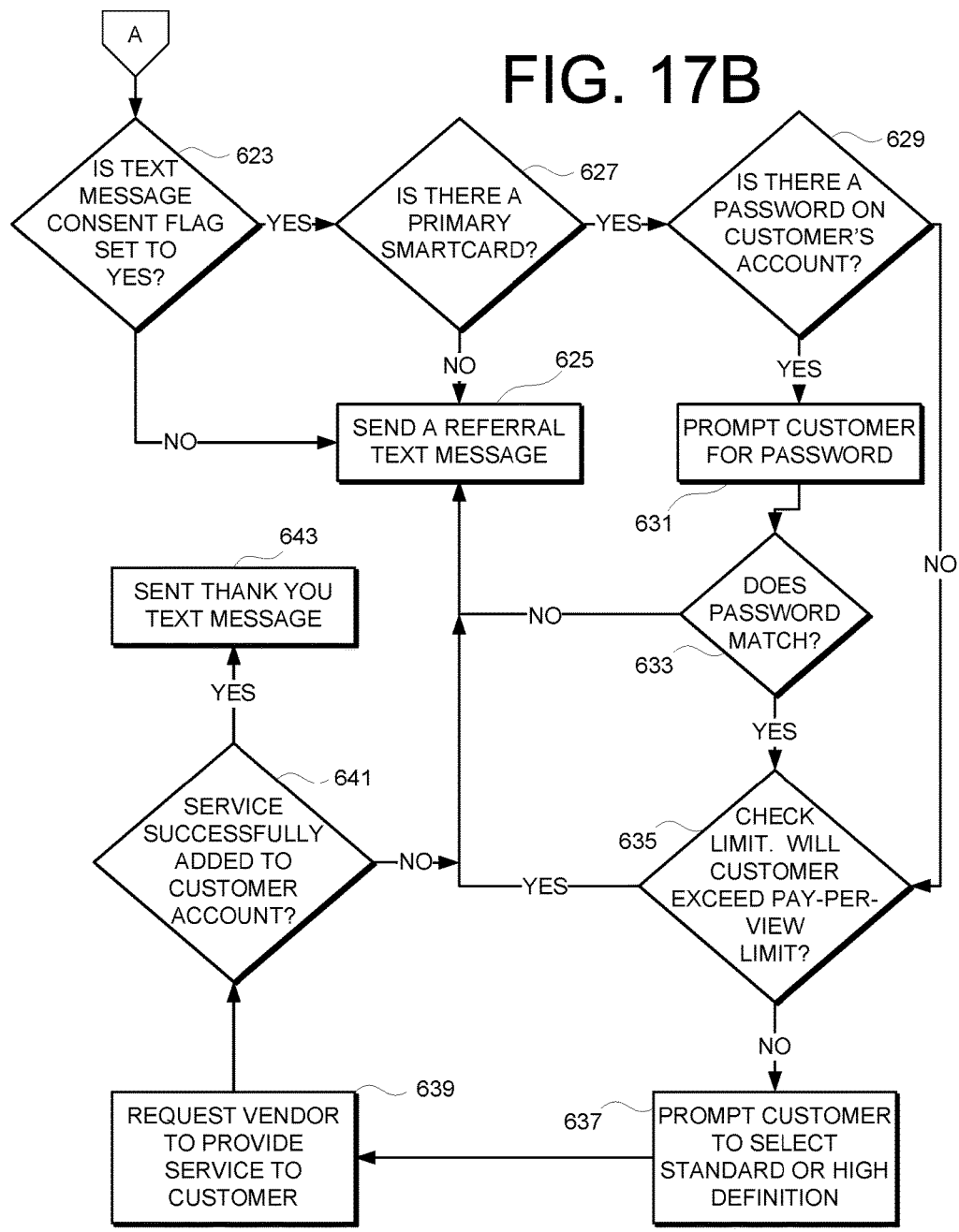

SYSTEMS AND METHODS FOR CONDUCTING TRANSACTIONS WITH A CUSTOMER USING TEXT MESSAGES

CROSS-REFERENCE TO RELATED APPLICATIONS

This application is a continuation from U.S. patent application Ser. No. 14/860,892, filed Sep. 22, 2015, and entitled "SYSTEMS AND METHODS FOR CONDUCTING TRANSACTIONS WITH A CUSTOMER USING TEXT MESSAGES", which is a continuation from U.S. patent application Ser. No. 14/476,801, filed Sep. 4, 2014, and entitled "CONDUCTING TRANSACTIONS BETWEEN A VENDOR AND A CUSTOMER USING TEXT MESSAGES", now issued U.S. Pat. No. 9,143,831 which is a continuation from U.S. patent application Ser. No. 14/089,927, filed Nov. 26, 2013, and entitled "CONDUCTING TRANSACTIONS BETWEEN A VENDOR AND A CUSTOMER USING TEXT MESSAGES", now issued U.S. Pat. No. 8,839,311, which is a continuation from U.S. patent application Ser. No. 12/726,512, filed Mar. 18, 2010, and entitled "SYSTEMS AND METHODS FOR CONDUCTING TRANSACTIONS WITH A CUSTOMER USING TEXT MESSAGES", now issued U.S. Pat. No. 8,621,536, each of which is incorporated by reference herein in its entirety.

BACKGROUND

Field of the Invention

The present invention relates generally to systems and methods for conducting a transaction. More particularly, the present invention relates to conducting transactions with a customer using text messages.

Description of the Related Art

Mobile communication devices are being used to accomplish an increasing number of tasks in our daily lives. For example, because mobile communication devices can be carried by their user, they can provide an effective means for vendors to reach potential or existing customers. Recent years have also seen increased usage of text messages, including short messaging service (SMS), by or between, mobile communication devices. Currently, vendors may fail to effectively utilize text messaging to advertise, sell, or otherwise conduct transactions related to their products or services. Governmental restrictions on text messaging between vendors and potential or existing customers may further hinder a vendor's usage of text messaging to conduct transactions related to their products or services. Currently available systems may fail to address this and other issues, and fail to provide an effective and convenient system by which to conduct transactions between a vendor and their potential or existing customers using text messages.

SUMMARY

The illustrative embodiments described herein are directed to a data processing system and, in particular, to systems and methods for conducting transactions with a customer using text messages. In one embodiment, a method includes receiving a first text message from a mobile communication device associated with a customer. The first text message includes a request from the customer to receive one or more text messages from a vendor. The method also includes adding the customer to a set of consenting customers in a customer database in response to receiving the first text message. The set of consenting customer including customers that consent to receiving text messages from the vendor. The method also includes sending a second text message to the mobile communication device. The second text message is associated with a service offered by the vendor.

In another embodiment, a method includes receiving a first text message from a mobile communication device associated with a customer. The first text message indicates the customer's consent to be contacted by a pay-per-view programming provider via text messaging. The method also includes adding the customer to a set of consenting customers in a customer database in response to receiving the first text message. The set of consenting customers includes customers consenting to the receipt of text messages from the pay-per-view programming provider. The method also includes sending a second text message to the mobile communication device. The second text message is associated with pay-per-view programming offered by the pay-per-view programming provider.

In another embodiment, a text message-based transaction system includes a text message transaction manager for conducting transactions with a customer using text messages. The text message transaction manager includes a customer database comprising a set of consenting customers that consent to receiving text messages from a vendor. The text message transaction manager also includes a customer intake module to receive text messages from mobile communication devices. Each of the mobile communication devices is associated with a respective customer. The customer intake module adds the customer to the set of consenting customers in the customer database when the customer intake module receives a first text message from the customer. The first text message includes a request from the customer to receive one or more text messages from the vendor. The text message transaction manager also includes a transaction engine to conduct a transaction with the customer using text messages.

BRIEF DESCRIPTION OF THE DRAWINGS

FIG. 2 is a schematic diagram showing an illustrative embodiment of the interaction between the components of FIG. 1;

FIG. 3 is a schematic, block diagram of a text message-based transaction system according to an illustrative embodiment;

FIG. 4 is a schematic, pictorial representation of a congratulatory text message according to an illustrative embodiment;

FIG. 5 is a schematic, pictorial representation of a text message prompting a customer to enter a phone number associated with his or her vendor account according to an illustrative embodiment;

FIG. 6 is a schematic, pictorial representation of a referral text message according to an illustrative embodiment;

FIG. 7 is a schematic, pictorial representation of a text message informing a customer of his or her pre-existing participation in a club associated with a vendor according to an illustrative embodiment;

FIG. 8 is a schematic, pictorial representation of a text message prompting the customer to enter his or her vendor password according to an illustrative embodiment;

FIG. 9 is a schematic, pictorial representation of a text message prompting the customer to select a program quality preference according to an illustrative embodiment;

FIG. 10 is a schematic, pictorial representation of a confirmation text message according to an illustrative embodiment;

FIG. 11 is a schematic, pictorial representation informing a customer that he or she will no longer be contacted by a vendor via text messaging according to an illustrative embodiment;

FIG. 12 is a schematic, pictorial representation of a help text message according to an illustrative embodiment;

FIG. 13 is a schematic, pictorial representation of a text message informing a customer that his or her response was not recognized according to an illustrative embodiment;

FIG. 17B is a flowchart showing the second part of the process of FIG. 17A; and

DETAILED DESCRIPTION

Figure 1:
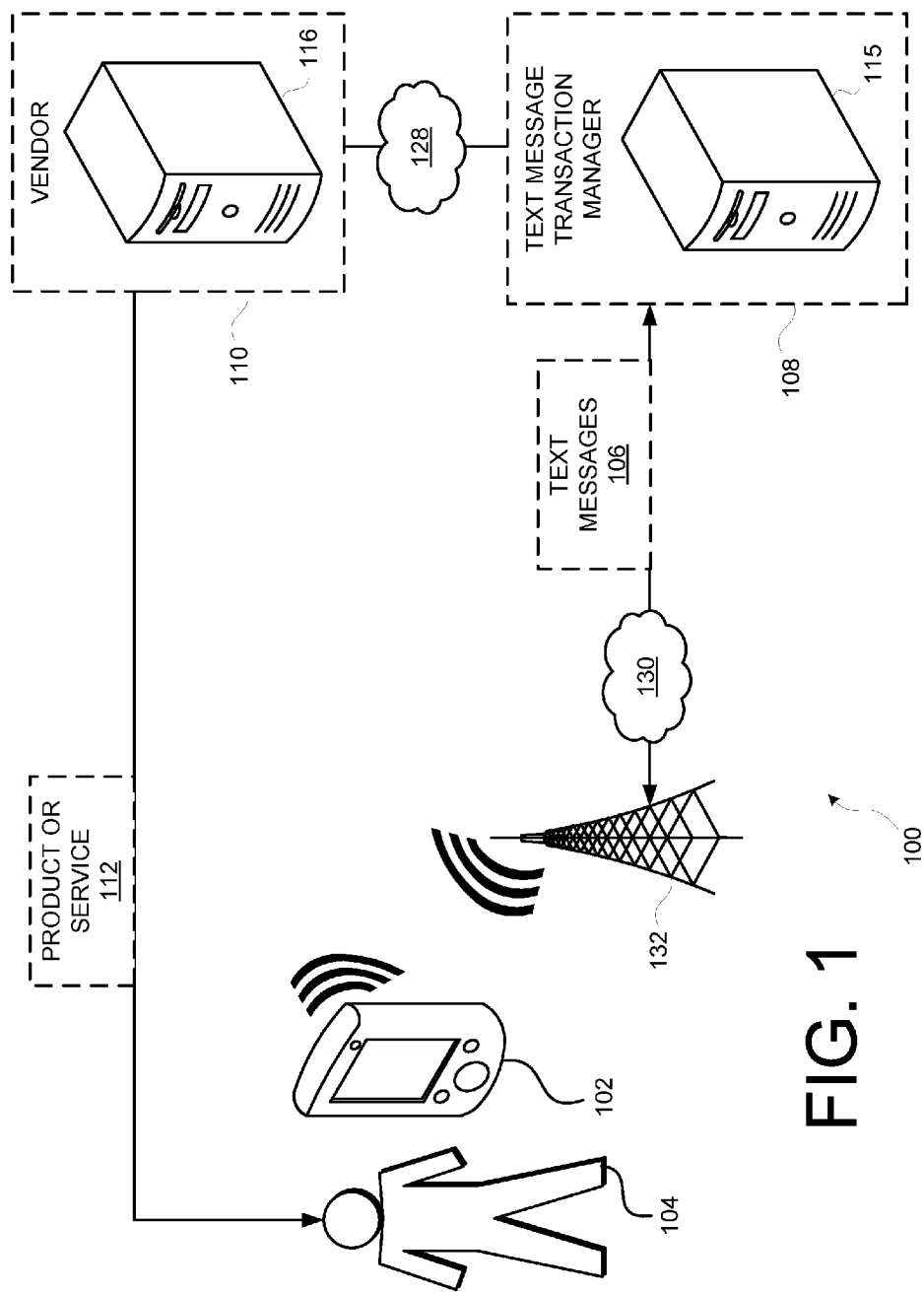
FIG. 1 is a schematic, pictorial representation of a text message-based transaction system according to an illustrative embodiment.

Referring to FIGS. 1 and 2, an illustrative embodiment of a text message-based transaction system 100 includes a mobile communication device 102 that may be used by a customer 104 to exchange text messages 106 with a text message transaction manager 108. Using the mobile communication device 102, the customer 104 may send a text message to the text message transaction manager 108 indicating the customer's consent for the text message transaction manager 108 to send one or more text messages to the customer 104 related to products or services 112 offered by a vendor 110. The customer 104 may be a past, current, or potential customer for vendor 110. The vendor 110 may be any provider of products or services, non-limiting examples of which include a pay-per-view programming provider, a seller of goods, a data provider, a professional or consumer service, etc. Unless otherwise indicated, as used herein, "or" does not require mutual exclusivity. As used herein, including in the claims, any reference to a service offered by a vendor also encompasses products offered by that vendor, and any reference to a product offered by a vendor also encompasses services offered by that vendor.

According to an illustrative embodiment, the text message transaction manager 108 determines when the customer 104 should or should not receive text messages related to the vendor 110. For example, as indicated above, the customer 104 may send a text message to the text message transaction manager 108 indicating his or her consent to be contacted regarding the vendor 110 via text message (data communication 114). When the customer 104 indicates his or her consent, the customer 104, or his or her vendor account, may be identified and added to a set of consenting customers stored in a customer database (not shown) maintained by the text message transaction manager 108 (process 116); additional details regarding such a customer database is described below. As used herein, the term "set" encompasses a quantity of one or more. Conversely, the customer 104 may desire to cease receiving text messages regarding the vendor 110. If so, the customer 104 may send a text message to the text message transaction manager 108 that requests the text message transaction manager 108 to cease sending text messages regarding the vendor 110 to the customer's mobile communication device 102.

After the customer 104 has indicated his or her consent to be contacted by the text message transaction manager 108, the text message transaction manager 108 may send or exchange the text messages 106 to or with the customer 104 to conduct any type of transaction related to the vendor 110. Non-limiting examples of the types of transactions that may be conducted using the text messages 106 include the purchase of products or services 112 from the vendor 110, advertising related to the vendor 110, individual or special offers for the customer 104 regarding the vendor's products or services 112, adding or removing the customer 104 as a member of a group associated with the vendor 110, questions, feedback, or surveys regarding the vendors products or services 112, providing technical help or other support to the customer 104, or any other communication related to the vendor 110 that is able to be executed using the text messages 106.

As one non-limiting example of a transaction, after the customer 104 sends a text message to the text message transaction manager 108 indicating that the customer 104 is willing to receive text messages regarding the vendor's products or services 112, the text message transaction manager 108 may send a text message to the customer 104 that includes an offer to purchase the vendor's products or service 112 (data communication 118). The customer 104 may then respond by sending a text message to the text message transaction manager 108 accepting the offer to purchase the vendor's product or service 112 (data communication 120). In the course of a text message transaction, the text message transaction manager 108 may conduct other text message transactions that are incidental to the primary transaction, such as verifying that the customer 104 has an active account with the vendor 110, obtaining a password from the customer 104 so that the customer 104 may access his or her account, ensuring that the customer 104 has consented to receiving text messages related to the vendor 110 from the text message transaction manager 108, ensuring that the customer 104 is not subject to any restrictions with respect to the vendor 110, prompting, or receiving a selection from, the customer 104 regarding details of the product or service 112, etc. After receiving an agreement from the customer 104 to purchase the product or service 112 from the vendor 110, the text message transaction manager 108 may request the vendor 110 to provide the product or service 112 to the customer 104 (data communication 122). The vendor 110 may then provide the product or service 112 to the customer 104 (transfer 124).

The mobile communication device 102 may be any device capable of sending or receiving a text message. For example, the mobile communication device 102 may be a cellular phone (e.g., a smart phone), a walkie talkie, a computer (e.g., a laptop, netbook, tablet computer, or minicomputer), a personal digital assistant, a digital music player, a digital reader, a portable gaming device, a web browsing device, a media player, or any other electronic device that is mobile and capable of text messaging functionality. In the embodiment in which the mobile communication device 102 is a cellular phone, the mobile communication device 102 may be any make or model, such as an iPhone® or other cellular phone made by Apple®, Inc., a Nexus One® or other cellular phone made by Google®, a Droid or other cellular phone made by Motorola®, a BlackBerry® or other cellular phone made by Research in Motion® Limited Corporation, a smartphone made by Samsung®, or any other type, make, or model of cellular phone or smartphone capable of text messaging functionality.

The text message transaction manager 108 may be implemented on one or more text message transaction servers 115. The text message transaction server 115 may be located at a data center or other location remote from the mobile communication device 102. In one embodiment, the text message transaction server 115 may be located at or near the vendor 110, such as on the vendor's premises. The vendor 110 may include one or more vendor servers 116. In one embodiment, some or all of the functionality of the text message transaction server 115 and the vendor server 116 may be combined into a single server or data processing system. In examples in which the product or service 112 offered by the vendor 110 is sendable, or otherwise manageable, by a data processing system, the vendor server 116 may send the product or service 112 to the customer 104, or otherwise perform a transaction related to the product or service 112 and the customer 104.

The techniques, technologies, or media by which the components of the text message-based transaction system 100 intercommunicate are numerous. For example, the text message-based transaction system 100, or any portion thereof, may be part of a personal area network (PAN), a local area network (LAN), a campus area network (CAN), a metropolitan area network (MAP), or any other network type. Data communication medium 128 between the vendor 110 and the text message transaction manager 108 may be any medium through which data can be communicated. For example, the data communication medium 128 may be wired or wireless data connections, and may utilize a virtual private network (VPN), multi-protocol label switching (MPLS), the Internet, or any other data communication media.

The data communication medium 130 between the text message transaction manager 108 and the base station 132 may be of the same or similar type as any of the non-limiting examples provided for the data communication medium 128. Wireless communication between the mobile communication device 102 and the base station 132 may utilize any wireless standard for communicating data, such as CDMA (e.g., cdmaOne or CDMA2000), GSM, 3G, 4G, Edge, an over-the-air network, Bluetooth, etc. Any of the transactions occurring in the text message-based transaction system 100 may be performed using secure SSL transactions.

In one example, the text message-based transaction system 100 may utilize the Internet, with any combination of the data communication media 128, 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. FIG. 1 is intended as an example, and not as an architectural limitation for the different illustrative embodiments.

Referring to FIGS. 3 through 13, an illustrative embodiment of the text message transaction manager 208 includes elements that facilitate the use of text messages to conduct transactions, or otherwise facilitate communication between, the mobile communication device 202 and the vendor 210. Components of FIGS. 3-13 that are analogous to components in FIGS. 1 and 2 have been shown by indexing the reference numerals by 100. The text message transaction manager 208 may conduct transactions for any number of vendors, and any number of customers and their respective mobile communication devices.

In one embodiment, the text message transaction manager 208 includes a customer intake module 234 that receives text messages from the mobile communication device 202, and that manages or co-manages a customer database 236. The customer database 236 includes a set of consenting customers 238. The consenting customers 238 include customers that consent to receiving text messages from the text message transaction manger 208 that relate to the vendor 210.

The customer intake module 234 may determine whether to add the customer 204 to the consenting customers 238 based on a text message from the customer 204 that requests, or otherwise consents to, the sending of text messages related to the vendor 210 to the mobile communication device 202. By way of non-limiting example, the customer 204 may text the word "join" to a predetermined number, such as 223322, to consent to the receipt of text messages from the text message transaction manager 208. Of course, the content of the text message that the customer 204 may send to indicate his or her intent to join the consenting customers 238 may vary.

Upon receiving the text message to join the consenting customers 238 from the customer 204, a customer identification module 240 may then identify the customer 204, or a vendor account associated with the customer 204. In one example, the customer identification module 240 may identify the customer 204, or a vendor account associated with the customer 204, using automatic number identification (ANI). If the customer identification module 240 is unable to identify the customer 204, or a vendor account associated with the customer 204, using automatic number identification, the text message transaction manager 208 may send a text message to the mobile communication device 202 prompting the customer 204 to enter account identification data, such as a phone number, a name, an account number, a credit card number, or any other data that could identify the customer 204 or a vendor account associated with the customer 204. A non-limiting example of a text message 242 prompting the customer 204 to enter account identification data is shown in FIG. 5. The text message 242, like other text messages described in the illustrative embodiments, may be displayed on a graphical user interface 244 of the mobile communication device 202. The customer identification module 240 may then receive a text message from the mobile communication device 202 that includes the account identification data. The customer identification module 240 may then identify the customer 204, or a vendor account associated with the customer 204, based on the account identification data.

In one embodiment, if the customer identification module 240 is unable to identify the customer 204, or a vendor account associated with the customer 204, using automatic number identification, the account identification data, or any other identification method, the text message transaction manager 208 may send a referral text message 246 to the mobile indication device 202. An example of the referral text message 246 is shown in FIG. 6, and may include a phone number, a website, or any other contact information that allows the customer 204 to seek additional assistance related to the vendor 210. The example referral text message 246, or any of the text messages described herein, may also refer to a group associated with the vendor 210, such as a "Text-to-Save Club", to which the customer 204 is considered to belong when he or she consents to receiving text messages from the text message transaction manager 208.

Once the customer identification module 240 identifies the customer 204, or a vendor account associated with the customer 204, the customer intake module 234 may add the customer 204 to the consenting customers 238 in the customer database 236. For example, the customer intake module 234 may add a customer record 248 for the customer 204 in the set of consenting customers 238 stored by the customer database 236. Inclusion of the customer record 248 in the consenting customers 238 allows the corresponding customer 204 to be contacted by the text message transaction manager 208 via text messages. As described above, the customer record 248 may be added to the consenting customers 238 in response to a text message, or other communication, from the customer 204 that indicates his or her consent to receiving text messages related to the vendor 210.

In one embodiment, the customer 204 may be associated with a text message consent flag 250 that has a changeable value based on whether the customer 204 consents to receiving text messages related to the vendor 210. For example, the text message consent flag 250 may be changeable between a first value, such as yes, and a second value, such as no. The text message consent flag 250 may be set to the first value when the customer 204 consents to receiving text messages related to the vendor 210. Conversely, the text message consent flag 250 may be set to the second value when the customer 204 does not consent to receiving text messages related to the vendor 210. The text message transaction manager 208 may determine, at any time, whether or not the customer 204 consents to receiving text messages related to the vendor 210 by determining the value of the text message consent flag 250.

Upon adding the customer 204 to the consenting customers 238, the text message transaction manager 208 may send a congratulatory text message 252 to the mobile communication device 202. A non-limiting example of the congratulatory text message 252 is shown in FIG. 4. The congratulatory text message 252 shown in FIG. 4 relates specifically to the vendor 210 that is a pay-per-view programming provider. In the non-limiting example of FIG. 4, the congratulatory text message 252 also includes an offer to receive an advertised movie, and invites the customer 204 to respond with a text message containing the term "yes" to receive the advertised movie. Details regarding purchase transactions managed by the text message transaction manager 208 are described below. The congratulatory text message 252 also includes a notice to the customer 204 that text messaging and data rates may apply to the text messages exchanged between the mobile communication device 202 and the text message transaction manager 208.

The congratulatory text message 252 also instructs the customer 204 to reply with a text message containing the term "help" to receive help from the text message transaction manager 208 or the vendor 210. If the customer 204 replies with a text message including the word "help", the text message transaction manager 208 may send a text message 254 that provides the customer 204 with details on how to obtain help from the text message transaction manager 208 or the vendor 210. An example of the text message 254 that provides such help to the customer 204 is shown in FIG. 12.

The congratulatory text message 252 shown in FIG. 4 also includes instructions on how the customer 204 may request to cease receiving text messages from the text message transaction manager 208. In the example of FIG. 4, the customer 204 may be instructed to send a text message including the word "stop" to be removed from the consenting customers 238. Details regarding the removal of the customer 204 from the consenting customers 238 are provided below. In one embodiment, the portion of the congratulatory text message 252 related to text message and data rates, help, and text message cancellation may be included in any or all of the text messages described in the illustrative embodiments.

In one embodiment, the customer intake module 234 may also determine whether the customer 204 has an active account with the vendor 210. Determining whether the customer 204 has an active account with the vendor 210 may occur at any time, such as before or after a purchase or other transaction facilitated by the text message transaction manager 258, or after the identification of the customer 204, or a vendor account associated with the customer 204, by the customer identification module 240. In the case in which the customer 204 is not found to have an active account with the vendor 210, the text message transaction manager 208 may send a referral text message, such as the referral text message 246 shown in FIG. 6.

In one embodiment, the customer intake module 234 may also be able to determine whether or not the consenting customers 238 includes the customer 204, such as by checking whether the consenting customers 238 includes the customer record 248. Such a determination may be used to check whether the customer 204 has previously been added to the consenting customers 238. To prevent adding the customer 204 to the consenting customers 238 more than once, the customer intake module 234 may add the customer 204 to the consenting customers 238 in response to determining that the consenting customers 238 does not include the customer 204. If the customer 204 is found to have been previously added to the consenting customers 238, a text message, such as the text message 255 shown in FIG. 7, may be sent to the mobile communication device 202.

The text message transaction manager 208 may also include a transaction engine 256 that conducts one or more transactions with the customer 204 using text messages. The transactions that are conducted by the transaction engine 256 with the customer 204 may be executed after the customer 204 has been added to the consenting customers 238 in the customer database 236. Examples of the types of transactions that may be conducted by the text message transaction manager 208 have been provided above. In the non-limiting example in which the vendor 210 is a pay-per-view programming provider, the transactions conducted by the transaction engine 256 may be associated with pay-per-view programming offered by the pay-per-view programming provider.

In one embodiment, the transaction conducted by the transaction engine 256 includes a purchase of products or services from the vendor 210, such as the purchase of a pay-per-view television program from a pay-per-view programming provider. The transaction may also include an offer, such as a special rate or other promotion, communicated to the customer 204 via a text message. An example of an offer to the customer 204 to purchase a service is shown in the congratulatory text message 252 in FIG. 4. In the congratulatory text message 252, the customer 204 is invited to purchase, or otherwise receive, a television program, in this case an advertised movie, from a vendor of television programming, such as a pay-per-view programming provider. In response, the customer 204 may accept the offer for a product or service offered by the vendor 210, and this acceptance may be communicated to the text message transaction manager 208 by a text message. In the example of the congratulatory text message 252 in FIG. 4, the customer 204 may indicate his or her acceptance of purchasing the advertised movie by sending a text message containing the word "yes" to the text message transaction manager 208.

In the course of accepting an offer, or conducting any other transaction related to the vendor 210, the customer 204 may be prompted to enter a password associated with his or her account. The transaction engine 256 may determine whether access to a vendor account for the customer 204 is associated with a password. In those cases in which a password is required for the customer 204 to access his or her account, a text message, such as a text message 258 in FIG. 8, may be sent to the customer 204 to prompt the customer 204 to enter his or her password. In response, the customer 204 may send a text message to the text message transaction manager 208 containing the customer's password. If the customer 204 provides the correct password, the customer 204 may be allowed access to his or her account, and be allowed to proceed with his or her transaction, such as a purchase transaction. If the transaction engine 256 determines that an incorrect password has been sent by the customer 204, the transaction engine 256 may send a referral message, such as the referral message 246 in FIG. 6 to the mobile communication device 202.

In one embodiment, the transaction engine 256 may include a parameter selection module 260 that determines a parameter for a product or service for which a transaction conducted by the transaction engine 256 pertains. For example, the parameter selection module 216 may allow the customer 204 to choose a parameter for the product or service that he or she purchases from the vendor 210. A parameter may be any feature or element of a product or service from the vendor 210. In the non-limiting example in which the vendor 210 is a pay-per-view programming provider, the parameter selection module 260 may allow the customer 204 to select a program preference for the pay-per-view television program purchased by the customer 204. For example, the program preference may be a program quality preference that is selectable between standard definition and high definition for the pay-per-view television program purchased by the customer 204.

To facilitate the selection of a program preference, the transaction engine 256 may send a text message 262 to the mobile communication device 202 that prompts the customer 204 to select the program preference. A non-limiting example of the text message 262 that may be used to prompt the customer 204 to select a program preference is shown in FIG. 9. In FIG. 9, the text message 262 instructs the customer 204 to press "1" for standard definition and "2" for high definition. The text message 262 also includes the prices for standard and high definition programming. In response, the customer 204 may send a text message to the text message transaction manager 208 that includes the selected program preference for the pay-per-view television program, or other product or service offered by the vendor 210. In the example of FIG. 9, the customer 204 may send a text message to the text message transaction manager 208 that includes either a "1" or a "2" depending upon his or her selection for standard or high definition programming. Of course, the types of parameters that may be selected by the customer 204 for the product or service purchased by the customer 204 may depend upon the product or service offered by the vendor 210.

In the embodiment in which the transaction relates to a purchase of products or services from the vendor 210, the transaction engine 256 may request the vendor 210 to provide the product or service to the customer 204 after the customer 204 has purchased the product or service. In one embodiment, prior to requesting the vendor 210 to provide the product or service to the customer 204, the transaction engine 256 may check the text message consent flag 250 to ensure that the customer 204 has elected to receive text messages related to the vendor 210. In the case in which the vendor 210 is a pay-per-view programming provider, the transaction engine 256 may request the vendor 210 to provide the customer 204 access to the purchased, or otherwise selected, pay-per-view television program, which has program parameters determined, or otherwise selected in conjunction with, the parameter selection module 260. Upon receiving the request from the text message transaction manager 208 to provide the product or service to the customer 204, the vendor 210 may provide the product or service to the customer 204. The transaction engine 256 may also send a confirmation text message 264 to the customer 204, an example of which is shown in FIG. 10. The confirmation message 264 in FIG. 10 may also include details regarding the product or service purchased by the customer 204.

The text message transaction manager 208 may also include a customer cancellation module 266 that is able to remove the customer 204 from the consenting customers 238 in the customer database 236. The customer cancellation module 266 may remove the customer 204 from the consenting customers 238 when the customer cancellation module 266 receives a text message from the customer 204 that includes a request from the customer 204 to cease receiving text messages related to the vendor 210. In one example, the customer cancellation module 266 may remove or delete the customer record 248 from the consenting customers 238. When the customer cancellation module 266 removes the customer 204 from the consenting customers 238, a cancellation text message 268 may be sent to mobile communication device 202, an example of which is shown in FIG. 11.

In some cases, the text message transaction manager 208 may not recognize, accept, or otherwise be able to interpret a text message from the customer 204. If so, the text message transaction manager 208 may notify the customer 204, via text message, of the text message transaction manager's inability to recognize the customer's text message. An example of a text message 270 that informs the customer 204 that the text message transaction manager 208 is unable to recognize the customer's text message is shown in FIG. 13.

Figure 14:
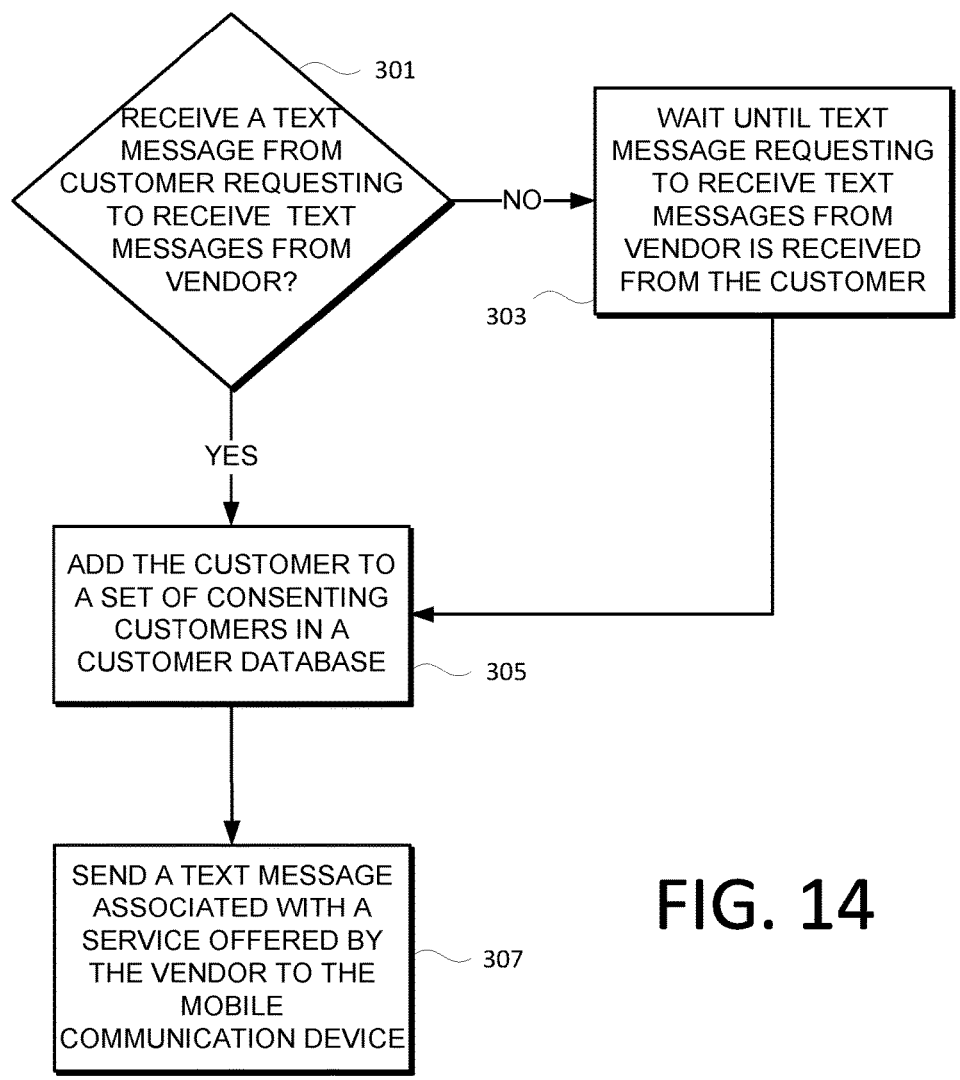
FIG. 14 is a flowchart of a process for conducting transactions with a customer using text messages according to an illustrative embodiment.

Referring to FIG. 14, an illustrative embodiment of a process for conducting transactions with a customer using text messages, which may be executed by a text message transaction manager, includes determining whether a text message from a customer requesting to receive text messages from a vendor is received (step 301). If the process determines that a text message from the customer requesting to receive text messages from the vendor is not received, the process waits until a text message requesting to receive text messages from the vendor is received from the customer (step 303). The process then proceeds to step 305.

Returning to step 301, if the process determines that a text message from the customer requesting to receive text messages from the vendor is received, the process adds the customer to a set of consenting customers and the customer database (step 305). The process sends a text message associated with a service offered by the vendor to a mobile communication device associated with the customer (step 307).

Figure 15:
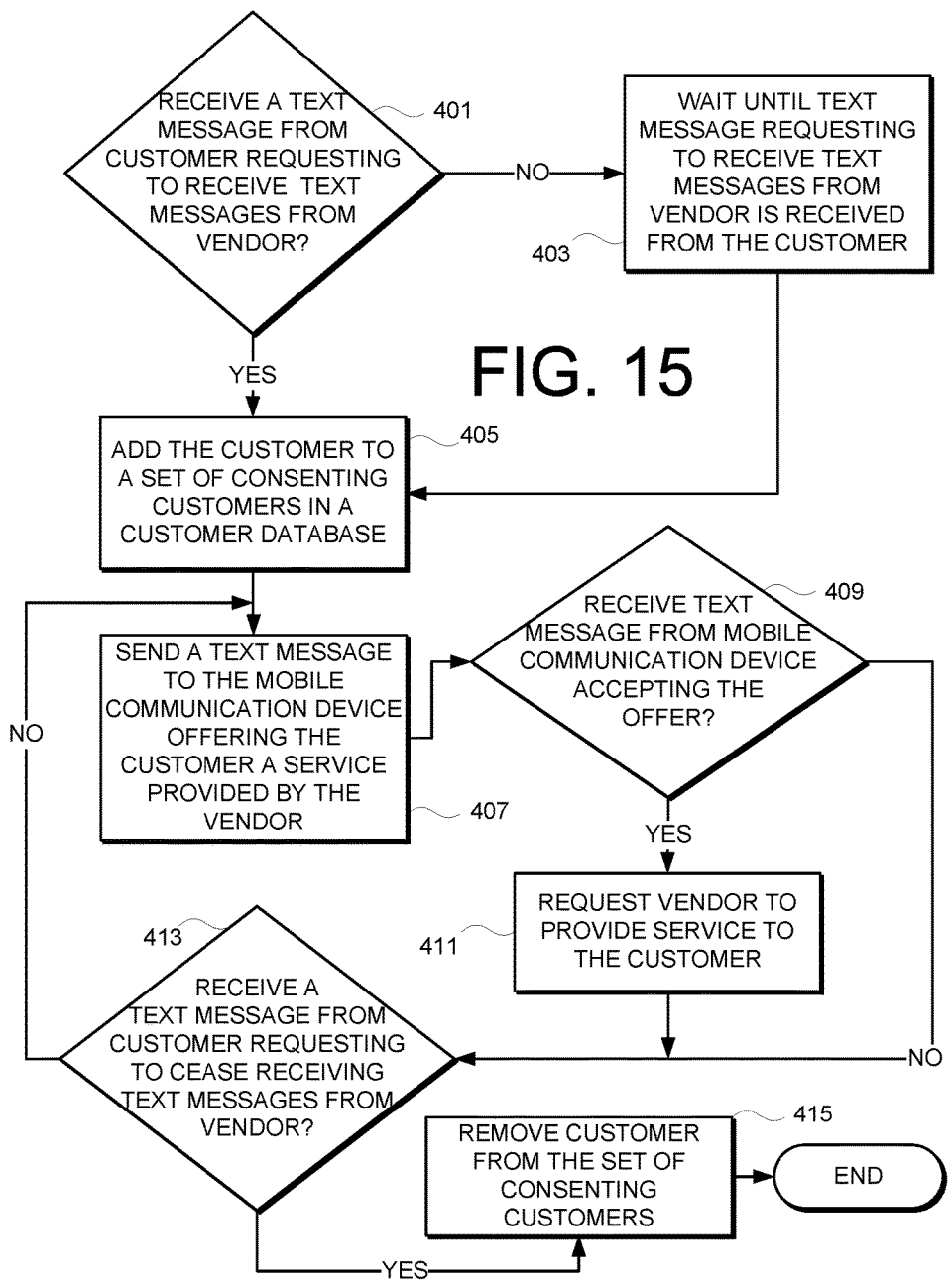
FIG. 15 is a flowchart of a process for conducting transactions with a customer using text messages according to another illustrative embodiment.

Referring to FIG. 15, an illustrative embodiment of a process for conducting transactions with a customer using text messages, which may be executed by a text message transaction manager, includes determining whether a text message from the customer requesting to receive text messages from the vendor is received (step 401). If the process determines that a text message from the customer requesting to receive text messages from the vendor is not received, the process waits until a text message requesting to receive text messages from the vendor is received from the customer (step 403). The process then proceeds to step 405.

Returning to step 401, if the process determines that a text message from the customer requesting to receive text messages from the vendor is received, the process adds the customer to a set of consenting customers in a customer database (step 405). The process sends a text message to the mobile communication device offering the customer a service provided by the vendor (step 407). The process determines whether a text message from the mobile communication device associated with the customer accepting the offer is received (step 409). If the process determines that a text message from the mobile communication device accepting the offer is received, the process requests the vendor to provide the service to the customer (step 411).

Returning to step 409, if the process determines that a text message from the mobile communication device accepting the offer is not received, the process determines whether a text message from the customer requesting to cease receiving text messages from the vendor is received (step 413). If the process determines a text message from the customer requesting to cease receiving text messages from the vendor is not received, the process returns to step 407; the process may wait any amount of time before returning to step 407. Returning to step 413, if the process determines that a text message from the customer requesting to cease receiving text messages from the vendor is received, the process removes the customer from the set of consenting customers (step 415). The process then terminates.

Figure 16:
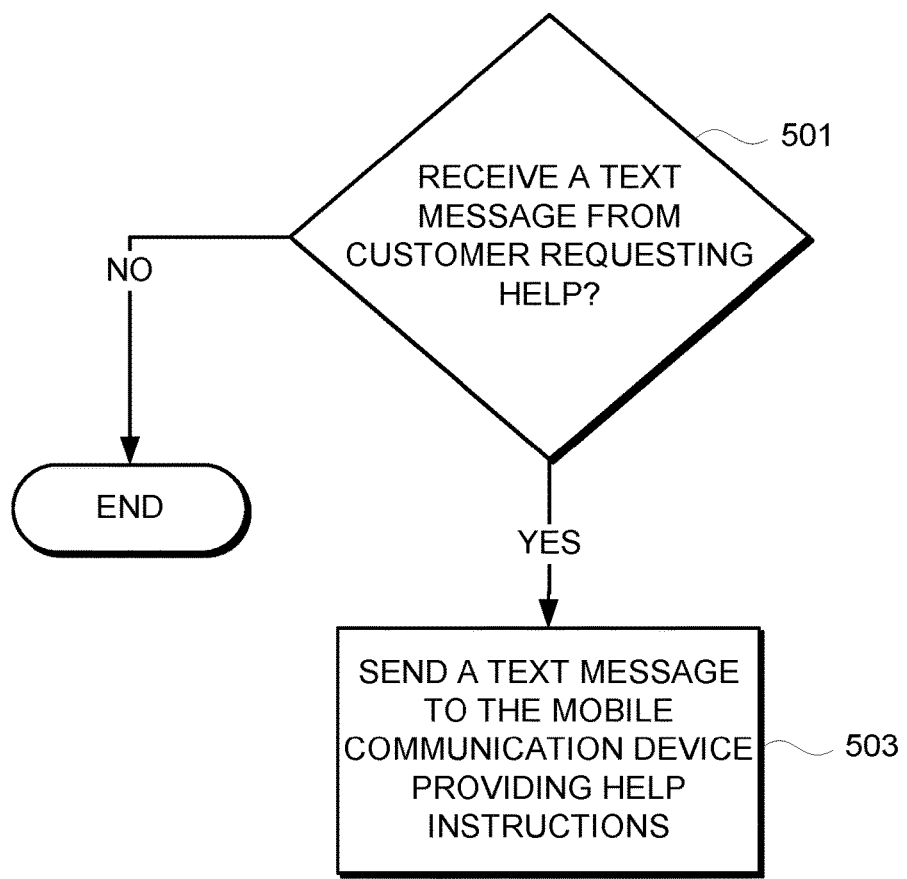
FIG. 16 is a flowchart of a process for conducting a help transaction with a customer using text messages according to an illustrative embodiment.

Referring to FIG. 16, an illustrative embodiment of a help process that is executable by a text message transaction manager includes determining whether a text message from a customer requesting help is received (step 501). If the process determines that a text message from the customer requesting help is received, the process sends a text message to the mobile communication device associated with the customer providing help instructions (step 503). Returning to step 501, if the process determines that a text message from the customer requesting help is not received, the process then terminates.

Figure 17A:
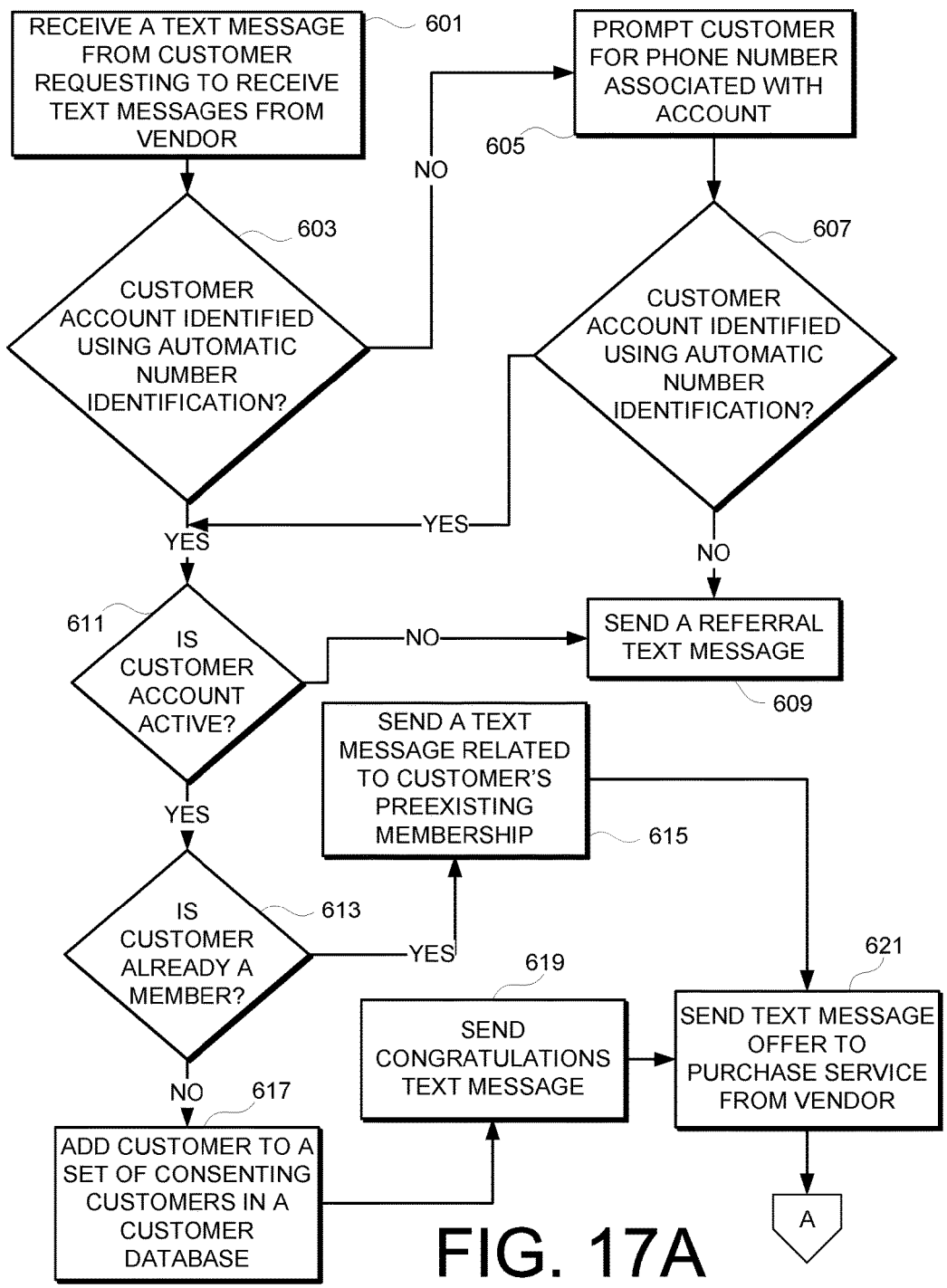
FIG. 17A is a flowchart showing the first part of a process for conducting transactions with a customer using text messages according to another illustrative embodiment.

Referring to FIGS. 17A and 17B, an illustrative embodiment of a process for conducting transactions with a customer using text messages, which may be executed by a text message transaction manager, is shown. The process shown in FIGS. 17A and 17B may be used when the vendor is a provider of data or television programs, such as a per-per-view programming provider. The process includes receiving a text message from a customer requesting to receive text messages from the vendor (step 601). The process determines whether the customer account is identified using automatic number identification (step 603). If the process determines that the customer account is not identified using automatic number identification, the process prompts the customer for a phone number associated with the account (step 605). The process then determines whether the customer account is identified using the phone number and/or automatic number identification (step 607). If the process determines that the customer account is not identified using the phone number and/or automatic number identification, the process sends a referral text message to the customer (step 609). Returning to step 607, if the process determines that the customer account is identified using the phone number and/or automatic number identification, the process proceeds to step 611.

Returning to step 603, if the process determines that the customer account is identified using automatic number identification, the process determines whether the customer account is active (step 611). If the process determines that the customer account is not active, the process proceeds to step 609 and sends a referral message. If the process determines that the customer account is active, the process determines whether the customer is already a member (step 613). For example, the process may determine whether the customer is already a member of a group or club that participates in transactions with the vendor using text messages. If the process determines that the customer is already a member, the process sends a text message related to the customer's pre-existing membership to the customer (step 615). The process then proceeds to step 621.

Returning to step 613, if the process determines that the customer is not already a member, the process adds the customer to a set of consenting customers in a customer database (step 617). The process may then send a congratulatory text message (step 619). The process then sends a text message offer to purchase a service from the vendor (step 621).

The process determines whether a text message consent flag is set to yes (step 623). If the process determines the text message consent flag is not set to yes, the process may then send a referral text message (step 625). If the process determines that the text message consent flag is set to yes, the process determines if there is a primary smartcard (step 627). For example, the process may determine whether there is a cable card or smartcard in a cable box associated with the customer to facilitate any transactions between the pay-per-view programming provider and the customer, such as providing the customer access to a purchased television program or movie.

If the process determines that there is not a primary smartcard, the process may proceed to step 625 and send a referral text message. If the process determines that there is a primary smartcard, the process may determine if there is a password on the customer's account (step 629). If the process determines that there is not a password on the customer's account, the process may proceed to step 635.

Returning to step 629, if the process determines that there is a password on the customer's account, the process may prompt the customer for the password using a text message (step 631). The process may then determine whether the password matches a password associated with the customer's account (step 633). If the process determines that the password does not match, the process may then proceed to step 625 and send a referral text message. If the process determines that the password does match, the process may then check a limit associated with the customer or the customer's account and determine if the customer will exceed a pay-per-view limit (step 635). If the process determines that the customer will exceed a pay-per-view limit, the process may proceed to step 625 and send a referral text message. If the process determines that the customer will not exceed a pay-per-view limit, the process may prompt the customer select standard or high-definition (step 637). The process may request a vendor to provide the purchased or requested service to the customer (step 639). The process may determine whether the service has been successfully added to the customer's account (step 641). Step 641 may include adding the service to the customer's account, such as through an application programming interface associated with the vendor. If the process determines that the service was not successfully added to the customer's account, the process may proceed step 625 and send a referral text message. If the process determines that the service was successfully added to the customer's account, the process may send a thank you text message to the customer (step 643).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 18:
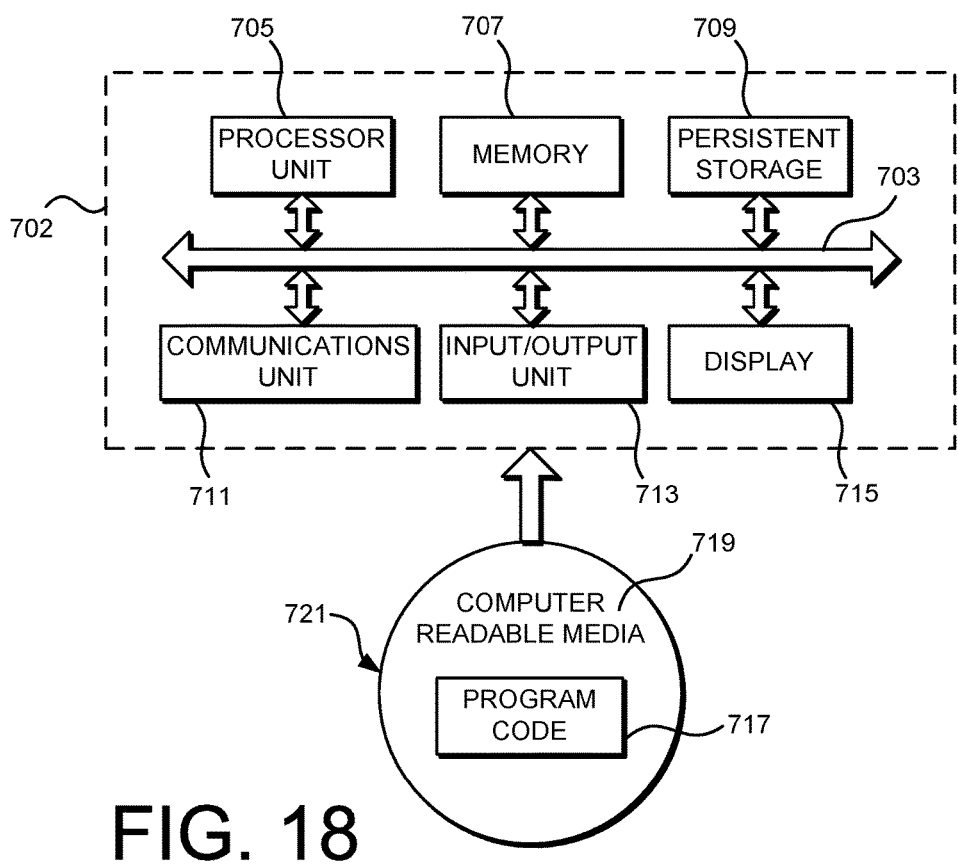
FIG. 18 is a schematic, block diagram of a data processing system in which the illustrative embodiments may be implemented.

Referring to FIG. 18, a block diagram of a computing device 702 is shown in which illustrative embodiments may be implemented. The computing device 702 may be the mobile communication device 102 or 202 described in FIG. 1 or 2, respectively. In another embodiment, the text message transaction manager 108 or 208 described in FIG. 1 or 2, respectively, may be implemented on the computing device 702. Computer-usable program code or instructions implementing the processes used in the illustrative embodiments may be located on the computing device 702. The computing device 702 includes a communications fabric 703, which provides communications between a processor unit 705, a memory 707, a persistent storage 709, a communications unit 711, an input/output (I/O) unit 713, and a display 715.

The processor unit 705 serves to execute instructions for software that may be loaded into the memory 707. The processor unit 705 may be a set of one or more processors or may be a multi-processor core, depending on the particular implementation. Further, the processor unit 705 may be implemented using one or more heterogeneous processor systems in which a main processor is present with secondary processors on a single chip. As another illustrative example, the processor unit 705 may be a symmetric multi-processor system containing multiple processors of the same type.

The memory 707, in these examples, may be, for example, a random access memory or any other suitable volatile or non-volatile storage device. The persistent storage 709 may take various forms depending on the particular implementation. For example, the persistent storage 709 may contain one or more components or devices. For example, the persistent storage 709 may be a hard drive, a flash memory, a rewritable optical disk, a rewritable magnetic tape, or some combination of the above. The media used by the persistent storage 709 also may be removable. For example, a removable hard drive may be used for the persistent storage 709.

The communications unit 711, in these examples, provides for communications with other data processing systems or communication devices. In these examples, the communications unit 711 may be a network interface card. The communications unit 711 may provide communications through the use of either or both physical and wireless communication links.

The input/output unit 713 allows for the input and output of data with other devices that may be connected to the computing device 702. For example, the input/output unit 713 may provide a connection for user input through a keyboard and mouse. Further, the input/output unit 713 may send output to a processing device. In the case in which the computing device 702 is a cellular phone, the input/output unit 713 may also allow devices to be connected to the cellular phone, such as microphones, headsets, and controllers. The display 715 provides a mechanism to display information to a user, such as a graphical user interface. The display 715 may be used to display the text messages described in the illustrative embodiments.

Instructions for the operating system and applications or programs are located on the persistent storage 709. These instructions may be loaded into the memory 707 for execution by the processor unit 705. The processes of the different embodiments may be performed by the processor unit 705 using computer-implemented instructions, which may be located in a memory, such as the memory 707. These instructions are referred to as program code, computer-usable program code, or computer-readable program code that may be read and executed by a processor in the processor unit 705. The program code in the different embodiments may be embodied on different physical or tangible computer-readable media, such as the memory 707 or the persistent storage 709.

Program code 717 is located in a functional form on a computer-readable media 719 and may be loaded onto or transferred to the computing device 702 for execution by the processor unit 705. The program code 717 and the computer-readable media 719 form computer program product 721 in these examples. In one embodiment, the computer program product 721 is the text message transaction manager 108 or 208 described in FIG. 1 or 2, respectively. In this embodiment, the program code 717 may include computer-usable program code capable of receiving a first text message from a mobile communication device associated with a customer. The first text message may include a request from the customer to receive one or more text messages associated with a vendor. The program code 717 may also include computer-usable program code capable of adding the customer to a set of consenting customers in a customer database in response to receiving the first text message. The set of consenting customers may include customers that consent to receiving text messages from the vendor. The program code 717 may also include computer-usable program code capable of sending a second text message to the mobile communication device. The second text message may be associated with a service offered by the vendor.

In another embodiment, the program code 717 may include computer-usable program code capable of receiving a first text message from a mobile communication device associated with a customer. The first text message may indicate the customer's consent to be contacted by a pay-per-view programming provider via text messaging. The program code 717 may also include computer-usable program code capable of adding the customer to a set of consenting customers in a customer database in response to receiving the first text message. The set of consenting customer may include customers consenting to the receipt of text messages from the pay-per-view programming provider. The program code 717 may also include computer-usable program code capable of sending a second text message to the mobile communication device. The second text message may be associated with pay-per-view programming offered by the pay-per-view programming provider. Any combination of the above-mentioned computer-usable program code may be implemented in the program code 717, and any functions of the illustrative embodiments may be implemented in the program code 717.

In one example, the computer-readable media 719 may be in a tangible form, such as, for example, an optical or magnetic disc that is inserted or placed into a drive or other device that is part of the persistent storage 709 for transfer onto a storage device, such as a hard drive that is part of the persistent storage 709. In a tangible form, the computer-readable media 719 also may take the form of a persistent storage, such as a hard drive or a flash memory that is connected to the computing device 702. The tangible form of the computer-readable media 719 is also referred to as computer recordable storage media.

Alternatively, the program code 717 may be transferred to the computing device 702 from the computer-readable media 719 through a communication link to the communications unit 711 or through a connection to the input/output unit 713. The communication link or the connection may be physical or wireless in the illustrative examples. The computer-readable media 719 also may take the form of non-tangible media, such as communication links or wireless transmissions containing the program code 717.

The different components illustrated for the computing device 702 are not meant to provide architectural limitations to the manner in which different embodiments may be implemented. The different illustrative embodiments may be implemented in a data processing system including components in addition to or in place of those illustrated for computing device 702. Other components shown in FIG. 18 can be varied from the illustrative examples shown.

As one example, a storage device in the computing device 702 is any hardware apparatus that may store data. The memory 707, the persistent storage 709, and the computer-readable media 719 are examples of storage devices in a tangible form.

In another example, a bus system may be used to implement the communications fabric 703 and may be comprised of one or more buses, such as a system bus or an input/output bus. Of course, the bus system may be implemented using any suitable type of architecture that provides for a transfer of data between different components or devices attached to the bus system. Additionally, the communications unit 711 may include one or more devices used to transmit and receive data, such as a modem or a network adapter. Further, a memory may be, for example, the memory 707 or a cache such as found in an interface and memory controller hub that may be present in the communications fabric 703.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

As used herein, including in the claims, the terms first, second, third, etc. . . . used in relation to text messages (e.g., first text message, second text message, etc.) are for reference or identification purposes only, and these terms are not intended to describe or suggest a number, order, source, purpose, or substantive quality for any text message for which such a term is used.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method, comprising:
   receiving a first text message from a mobile communication device associated with a customer, the first text message comprising a request from the customer to receive one or more text messages associated with a vendor;
   sending a second text message to the mobile communication device, wherein the second text message includes an offer from the vendor to provide a service to the customer;
   receiving a third text message from the mobile communication device, the third text message comprising an acceptance of the offer;
   requesting the vendor to provide the service to the customer;
   when a text message accepting the offer has not been received within a predetermined amount of time, sending another text message associated with another offer to the mobile communication device; and
   wherein the customer is associated with a text message consent flag changeable between a first value and a second value, the text message consent flag set to the first value if the customer consents to receiving text messages from the vendor, the text message consent flag set to the second value when the customer does not consent to receiving text messages from the vendor.

2. The method of claim 1, comprising, when a text message accepting the offer has not been received within a predetermined amount of time, sending another text message associated with the service offered by the vendor to the mobile communication device.

3. The method of claim 2, the method further comprising:
   determining the value of the text message consent flag in response to receiving the third text message from the mobile communication device; and
   requesting the vendor to provide the service to the customer in response to the text message consent flag being set to the first value.

4. The method of claim 2, wherein the vendor provides the service to the customer in response to the vendor receiving the request to provide the service to the customer.

5. The method of claim 1, further comprising:
receiving a third text message from the mobile communication device, the third text message comprising a request to cease receiving text messages from the vendor; and
removing the customer from a set of consenting customers in a customer database.

6. The method of claim 1, further comprising identifying the customer using automatic number identification in response to receiving the first text message.

7. The method of claim 1, further comprising:
attempting to identify the customer using automatic number identification;
in response to a failure to identify the customer using automatic number identification, sending a third text message to the mobile communication device prompting the customer to enter account identification data;
receiving a fourth text message from the mobile communication device, the fourth text message comprising the account identification data; and
identifying the customer using the account identification data.

8. The method of claim 7, wherein the account identification data is a phone number associated with the customer.

9. The method of claim 1, further comprising determining whether the customer has an active account with the vendor after receiving the first text message from the mobile communication device.

10. The method of claim 1, further comprising:
adding the customer to a set of consenting customers in a customer database in response to receiving the first text message, the set of consenting customers comprising customers that consent to receiving text messages from the vendor; and
determining whether the set of consenting customers includes the customer, wherein adding the customer to the set of consenting customers in the customer database is in response to determining that the set of consenting customers does not include the customer.

11. The method of claim 1, further comprising:
determining whether access to a vendor account for the customer is associated with a password; and
in response to determining that access to the vendor account for the customer is associated with the password, sending a third text message to the mobile communication device, the third text message prompting the customer to input the password for the vendor account associated with the customer.

12. A method, comprising:
receiving a first text message from a mobile communication device associated with a customer;
sending a second text message to the mobile communication device, wherein the second text message includes an offer from a pay-per-view programming provider to provide access to a pay-per-view television program;
receiving a third text message from the mobile communication device, the third text message comprising an acceptance of the offer;
requesting a pay-per-view programming provider to provide access to the pay-per-view television program to the customer;
when a text message accepting the offer has not been received within a predetermined amount of time, sending another text message associated with the pay-per-view program offered by the pay-per-view programming provider to the mobile communication device; and
wherein the customer is associated with a text message consent flag changeable between a first value and a second value, the text message consent flag set to the first value if the customer consents to receiving text messages from the pay-per-view programming provider, the text message consent flag set to the second value when the customer does not consent to receiving text messages from the pay-per-view programming provider.

13. The method of claim 12, wherein the first text message indicates the customer's consent to be contacted by the pay-per-view programming provider via text messaging.

14. The method of claim 12, wherein the second text message includes an offer from the pay-per-view programming provider to provide access to a pay-per-view television program, the method further comprising:
receiving a third text message from the mobile communication device, the third text message comprising an acceptance of the offer;
sending a fourth text message to the mobile communication device, the fourth text message prompting the customer to select a program preference for the pay-per-view television program;
receiving a fifth text message from the mobile communication device, the fifth text message comprising a selected program preference for the pay-per-view television program; and
requesting the pay-per-view programming provider to provide access to the pay-per-view television program having the selected program preference to the customer.

15. The method of claim 14, wherein the program preference is a program quality preference selectable between at least a standard definition and a high definition.

16. The method of claim 12, the method further comprising:
sending the second text message to the mobile communication device in response to determining that the text message consent flag has the first value.

17. A system, comprising:
At-least one processor; and
A software agent operated by the processor and configured to comprise:
a text message transaction manager, comprising:
a customer intake module configured to receive text messages from mobile communication devices, each of the mobile communication devices associated with a respective customer; and
a transaction engine configured to conduct a transaction with a customer via text messages;
wherein the transaction comprises a purchase of a service from a vendor, and
wherein the transaction engine further comprises a parameter selection module to
determine a parameter for the service provided to the customer based on a customer selection;
wherein the text message transaction manager is further configured to, when a text message accepts the offer has not been received within a predetermined amount of time, send another text message associated with the service offered by the vendor to the mobile communication device; and
wherein the customer is associated with a text message consent flag changeable between a first value and a second value, the text message consent flag set to the first value if the customer consents to receiving text messages from the vendor, the text message consent flag set to the second value when the customer does not consent to receiving text messages from the vendor.

18. The system of claim 17, wherein the customer intake module is further configured to add the customer to a set of consenting customers in a customer database when the customer intake module receives a first text message from the customer; and wherein the text message transaction manager further comprises a customer cancellation module configured to remove the customer from the set of consenting customers in the customer database when the customer cancellation module receives a second text message, the second text message comprising a request to cease receipt of text messages associated with the vendor.

19. The system of claim 17, wherein the transaction comprises a purchase of a service from the vendor, and wherein the text message-based transaction system further comprises the vendor configured to provide the service to the customer.

20. The system of claim 17, comprising a customer database comprising a set of customers that consent to receipt of text messages from the vendor.

\* \* \* \* \*